May 12, 1970 D. F. GERMAN ET AL 3,511,341
AIR LINE LUBRICATOR

Filed June 6, 1968 2 Sheets-Sheet 1

Inventors:
Dale F. German
Wilbert G. Kautz
By Bair, Freeman & Molinare
Attys.

May 12, 1970  D. F. GERMAN ET AL  3,511,341
AIR LINE LUBRICATOR

Filed June 6, 1968  2 Sheets-Sheet 2

Inventors:
Dale F. German
Wilbert G. Kautz
By Bair, Freeman & Molinare
Attys.

United States Patent Office 3,511,341
Patented May 12, 1970

3,511,341
AIR LINE LUBRICATOR
Dale F. German, Bryan, and Wilbert G. Kautz, West Unity, Ohio, assignor to The Aro Corporation, Bryan, Ohio, a corporation of Ohio
Filed June 6, 1968, Ser. No. 735,038
Int. Cl. F16n 7/34
U.S. Cl. 184—55
20 Claims

ABSTRACT OF THE DISCLOSURE

A convertible air line lubricator adapts to provide a "fog" oil mist or a "drop" oil mist to a pneumatic line. Air pressure at the lubricator inlet forces oil from a first chamber through a conduit into a seond chamber to be fogged or directly sent into the air stream as "fog" oil mist or a "drop" oil mist to a pneumatic line. droplets of the lubricator. Oil entering the second chamber passes into a venturi type atomizer which subsequently introduces a "fog" oil mist through the outlet of the lubricator. A spring biased compensator plate provides a variable orifice in a passage leading from the air inlet to the air outlet and insures a pressure drop between the first and second chamber and a linear increase or decrease in the quantity of oil supplied to the air pressure outlet in response to air flow increases or decreases.

BACKGROUND OF THE INVENTION

This invention relates to an air line lubricator and, more particularly, to an air line lubricator which may easily be converted into either a "fog-type" or "drop-type" air line lubricator.

As well known in the art, a fine mist or drops of oil are fed into pnuematic lines to facilitate operation of pneumatic driven tools. The oil serves to make the air a lubricating medium as well as a power source thereby preventing the moving parts of air tools from seizing and excessive wear.

In practice it has been found that for certain applications it is most desirable to have a "drop-type" lubricator. The drop-type lubricator injects drops of oil directly into the air line. For other applications it has been found that a "fog-type" lubricator is most desirable. The fog-type atomizes the oil into a fine mist. Only the smaller droplets of the oil mist eventually pass into the air line. This is accomplished by "atomizing" the oil and then "reclassifying" the resulting atomized oil. Reclassification of the atomized oil causes the larger atomizer droplets in the mist to return to the oil supply while the fined atomized droplets enter into the outlet air stream.

In the past when applications have called for the use of a fog-type rather than a drop-type lubricator or vice versa, it has been necessary to substitute lubricators in the air line. The lubricator of the present invention provides a means whereby a single lubricator can provide either fog-type or drop-type lubrication to an air line by means of a simple and quick adjustment performed on the lubricator without removing the lubricator from the air line.

SUMMARY OF THE INVENTION

In a principle aspect the present invention comprises a convertible lubricator having an air pressure inlet which leads to an oil filled first chamber and acts upon oil in this chamber to force it through a conduit from the first chamber to a second chamber or directly into the air stream. Oil from the conduit may be directed directly into the air outlet in the manner of a drop type lubricator or alternatively into the second chamber and mist forming means in the second chamber. The mist is reclassified and ultimately passes into the lubricator outlet. An air passageway or conduit may also be provided leading from the air inlet to the air outlet which includes means for increasing the quantity of oil entering the outlet in a linear fashion in response to the increase in air flow rate through the lubricator.

It is thus an object of the present invention to provide a convertible air line lubricator which provides both drop-type and fog-type lubrication.

It is a further object of the present invention to provide an air line lubricator which is economical to manufacture and of a simplified construction.

Still another object of the present invention is to provide an air line lubricator which includes means for providing an increase or decrease in oil quantity in substantially direct portions to an increase or decrease in air flow rate.

One further object of the present invention is to provide an air line lubricator which may be filled with oil or lubrication fluid when air pressure is provided to the lubricator.

These and other objects, advantages and features of the present invention will be more fully set forth in the detailed description which follows:

BRIEF DESCRIPTION OF THE DRAWING

In the detailed description which follows reference will be made to the drawings comprised of the following figures.

DESCRIPTION OF THE PREFERRED EMBODIMENT

Figure 1:
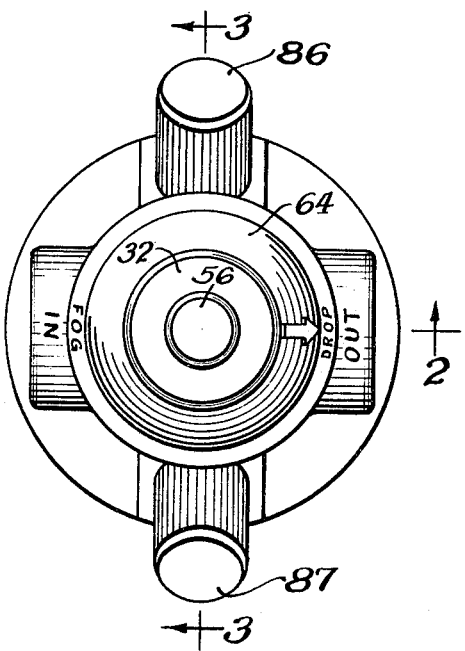
FIG. 1 is a top plan view of the convertible air line lubricator of the present invention.
Figure 2:
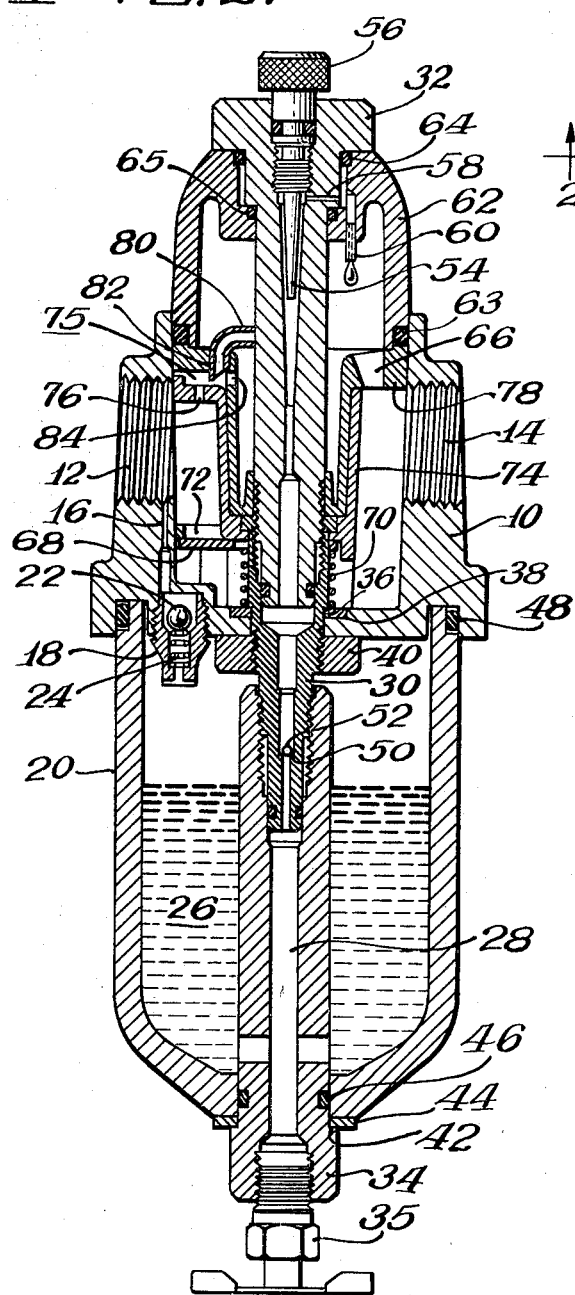
FIG. 2 is a side cross sectional view of the lubricator of the present invention taken substantially along the line 2—2 of FIG. 1.
Figure 3:
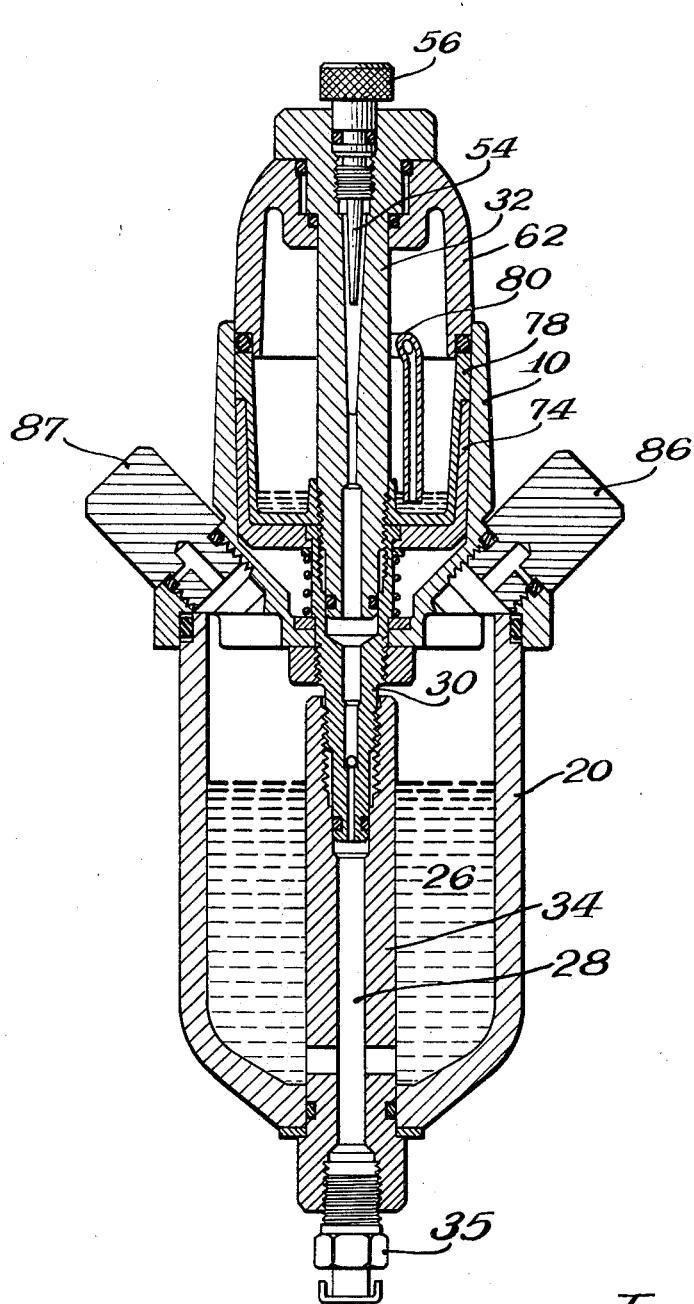
FIG. 3 is a side cross sectional view of the lubricator taken at right angles to the view shown in FIG. 2 and substantially along the line 3—3 of FIG. 1.

In the following description reference will be made, more particularly, to FIGS. 2 and 3 since these figures illustrate in greater detail the internal construction of the lubricator of the present invention. Referring first to FIG. 2, the lubrictor of the invention includes a base 10 which has an air inlet 12 and an air outlet 14. Air pressure lines (not shown) are attached to the inlet 12 and outlet 14 so that air flows through the lubricator in the direction indicated by the arrow on the lubricator in FIG. 1. The air inlet 12 is, of course, the high pressure side of the lubricator. Air entering through the inlet 12 flows in three directions into the lubricator.

One flow passes downward through a small diameter opening 16 in the base 10, then through a valve housing 18 threadably inserted into the base 10, and finally into the interior or chamber of an oil bowl 20. A ball valve 22 is supported by a spring 24 in the valve housing 18 so that the air flow passage through the valve housing 18 is normally open. The pressure in the chamber of the bowl 20 above a supply of oil 26 is high pressure and substantially equal to the pressure at the air inlet 12.

The high pressure in the bowl 20 acts to force oil 26 through an oil flow passage or conduit 28 disposed on the central vertical axis of the lubricator. The conduit 28 is defined by a tie rod connector or adaptor 30, an upper tie rod 32, and a lower tie rod 34 all threadably connected. The adaptor 30 is rigidly connected to the base 10 through a central opening in the base 10 and is held in that position by coaction of a flange 36 abutting a washer or gasket 38 and a base support nut 40. The washer 38 is used to hold the spring 70 and compensator plate 68 (described below) in position during assembly of the lubricator.

A valve seat 50 is provided in the oil flow passage 28 of adaptor 30. A ball valve 52 seats against the seat 50 whenever the oil flow through the passage 28 tends to flow into the bowl 20.

Lower tie rod 34 includes a flange 42 which cooperates with a washer 34 to hold bowl 20 in sealing engagement with base 10. An O-ring 46 between the bowl 20 and the lower tie rod 34 and an O-ring 48 between the bowl 20 and the base 10 provide an air tight seal for the chamber enclosed by the bowl 20. A removable petcock or valve 35 is threaded into the rod 34.

The passage 28 in upper tie rod 32 includes a flared conical shaped opening. A tapered oil flow adjustment stem 54 is inserted into this flared opening. By manually rotating an oil adjustment screw 56 which is merely the head of stem 54, oil flow through the passage 28 in the upper tie rod 32 can be precisely controlled. Once the desired rate of oil flow is obtained through the passage 28, the long taper on the oil adjustment stem 54 holds the rate of oil flow substantially constant. Because of the large area of restriction of the stem 54, the long taper virtually eliminates any oil flow slow down effect commonly occurring in lubricators which are continuously used at one setting.

Oil forced up through the passage 28 exits from the passage 28 through an aperture 58 and then through a tube 60 into the chamber formed by a sight gauge 62. The sight gauge 62 is fastened to the base 10 by the upper tie rod 32 and sealed by means of O-rings 63, 64 and 65.

In the configuration shown in FIG. 2 oil discharges from the tube 60 as small drops through the chamber of the sight gauge 62, then through a discharge port 66 in base 10 and finally into the area of the outlet 14. Thus, air passing from the inlet 12 through the outlet 14, as will be described in greater detail below, becomes injected directly with drops of oil from the tube 60. In this manner the lubricator acts as a drop-type lubricator.

As previously described, the air passing into inlet 12 has three possible flow paths and the first path was described as passing from the inlet 12 into the bowl 20. The second path of high pressure air is through the inlet 12 and down through an opening 72 in a cup support member 74. The high pressure air forces a compensator plate 68 against a biasing spring 70. In this manner the air flow path between the inlet and outlet is restricted. This restriction in the flow causes a slight pressure drop from the inlet side of the lubricator to the outlet side.

In addition, the compensator plate 68 and the spring 70 substantially eliminate flooding of the lubricator. Flooding occurs when oil delivery is not directly proportional to the air flow. For example, if the oil delivery is set at one drop per minute when the air flow is ten cubic feet per minute, an uncompensated lubricator would normally increase the oil flow or delivery to four drops per minute as the air pressure increased to 20 cubic feet per minute. However, with the compensator of the present invention, as the air flow is increased to 20 cubic feet per minute in our example, the oil delivery rate would be increased to two drops per minute. Therefore, the compensating feature of the present invention causes oil to be delivered proportionally or linearly rather than to the second power or some other function of the increase in air flow rate.

The third path of air flow is through an upper port 76 in the top support member 74 and into a small chamber 75 defined by a cup 78 and the cup support member 74. The high pressure air flow continues past the tip of a venturi forming tube 80 and finally flows into the chamber within the sight gauge 62 defined by the sight gauge 62 and the cup 78. As illustrated in FIG. 3 the venturi forming tube 80 extends down into an oil supply at the bottom of the cup 78. As high pressure air passes by the tip 82 of the venturi forming tube, the restriction of the tube in the opening 84 leading into the upper chamber of the lubricator provides a pressure drop and also causes the venturi effect. Oil is then drawn from the bottom of the cup 78 up through the tube 80. The air mixes with the oil and passes as a fine atomized oil mist into the upper chamber defined by the sight gauge 62.

The atomized oil passes through the upper chamber, defined by the sight gauge 62, and finally through the discharge port 66 into the outlet 14. On its way to the outlet 14 the atomized oil and air mixture is "reclassified." By reclassification, large atomized droplets are returned by means of gravity to the oil supply in the cup 78 whereas finer atomized droplets remain in the air stream and pass into the outlet 14.

Whereas the lubricator as illustrated in FIG. 2 is adapted for drop-type lubrication because the oil drops directly from the tube 60 into the outlet 14, a simple external adjustment to the lubricator converts it into a fog-type lubricator. To perform this conversion the upper tie rod 32 is unscrewed until the sight gauge 62 loosens slightly. The sight gauge 62 is turned 180° and the upper tie rod is tightened.

Oil from the bowl 20 is then delivered to the top of the lubricator by the same method described for the drop lubricator. However, instead of dropping the oil into the air stream directly, oil drops into the cup 78. The oil then enters the air stream as a mist or fog as previously described.

The lubricator may also be filled under pressure without shutting the inlet air line to the lubricator. This is effected by removing a fill plug as at 86 or 87 in FIG. 3. For example, removal of fill plug 86 causes an instantaneous pressure reduction in the bowl 20. This reduction in pressure causes high pressure air on the upper side of the ball valve 22 to overcome the force of the spring 24 thereby closing the air passage to the bowl 20. At the same time the pressure in the upper portion or sight gauge 62 of the lubricator forces the ball valve 52 onto its seat 50 thereby shutting off passage 28 from the bowl 20. The bowl 20 may then be filled through the opening exposed by the removed fill plug 86.

After filling the bowl 20, the fill plug 86 is again inserted. Because the adaptor 30 does not have a positive seal with the base 10, high pressure air is allowed to leak into the bowl 20. This permits the bowl 20 to become pressurized again thereby releasing the ball valve 22. When the bowl 20 again becomes fully pressurized, air flow conditions are stabilized so that air pressure in the upper portion of the lubricator, namely within the chamber defined by the sight gauge 62, is again lower than the pressure in the bowl 20. The ball valve 52 then unseats permitting oil to flow through passage 28.

What is claimed is:
1. A convertible lubricator comprising, in combination:
   air pressure inlet means for connection to an air pressure source
   a first oil containing chamber connected with said air pressure inlet means to provide relatively high pressure to said first chamber,
   air and oil mist outlet means,
   a second oil mist and air containing chamber connected with said air and oil mist outlet means and also with said air pressure inlet means, said connection with said inlet means including oil mist forming means,
   oil conduit means from said first chamber to said second chamber, said conduit means including means for directing oil into said outlet means such that oil drops directly into said outlet stream of air as a drop lubricator and alternatively directing oil into said oil mist forming means such that an oil mist is provided for an air outlet stream.

2. The lubricator of claim 1 including oil flow control means in said oil conduit to control oil flow through said conduit to said second chamber.

3. The lubricator of claim 1 including oil flow compensator means adapted to increase oil flow into said outlet means in a substantially linear relation in response to an increase in air flow through said lubricator.

4. The lubricator of claim 3 wherein said compensator means comprises air passageway means from said air inlet to said air outlet, said air passageway means including variable orifice means for controlling air flow therethrough.

5. The lubricator of claim 1 wherein said oil mist forming means comprise a tube terminating in the connection between said air inlet means and said second chamber, said tube coacting with said connection to provide a venturi effect, the other end of said tube extending to a source of oil such that air flow through said connection draws oil through said tube to form a fine oil mist and air mixture in said second chamber, said oil mist and air mixture being subsequently transportetd through said outlet means.

6. The lubricator of claim 5 wherein said oil source comprises an oil cup supplied by said oil conduit.

7. The lubricator of claim 1 wherein means for directing oil into said outlet means and alternatively into said oil mist forming means comprise a rotatable conduit connection from said oil conduit adapted to alternatively direct oil into said outlet means and into said oil mist forming means.

8. The lubricator of claim 1 including valve means between said inlet means and said first chamber, said valve means adapted to close whenever said air inlet pressure is substantially greater than said first chamber pressure.

9. The lubricator of claim 1 including valve means within said oil conduit adapted to close said oil conduit whenever flow of oil tends to flow from said second chamber to said first chamber and open when said oil tends to flow from said first chamber to said second chamber.

10. The lubricator of claim 1 including fill plug means to said first chamber for opening said chamber to provide for filling of said first chamber with oil.

11. A lubricator comprising, in combination:
air pressure inlet means for connection to an air pressure source,
a first oil containing chamber connected with said air pressure inlet means to provide relatively high pressure to said first chamber,
air and oil mist outlet means,
a second chamber connected with said outlet means, said second chamber including means for discharging oil into said outlet means,
oil conduit means from said first chamber to said second chamber,
air passageway means from said inlet means to said outlet means, said air passageway means including variable orifice means for controlling pressure drops between said inlet means and outlet means, and increase oil flow into said outlet means in a substantially linear relation in response to an increase in air flow through said lubricator,
valve means between said inlet means and said first chamber, said valve means adapted to close whenever said air inlet pressure is substantially greater than said first chamber pressure, and
fill plug means to said first chamber for opening said chamber to provide for filling of said first chamber with oil.

12. The lubricator of claim 11 including oil flow control means in said oil conduit to control oil flow through said conduit to said second chamber.

13. The lubricator of claim 11 including valve means within said oil conduit adapted to close said oil conduit whenever flow of oil tends to flow from said second chamber to said first chamber and open when said oil flow tends from said first chamber to said second chamber.

14. A lubricator comprising, in combination:
air pressure inlet means for connection to an air pressure source,
a first oil containing chamber connected with said air pressure inlet means to provide relatively high pressure in said first chamber,
air and oil mist outlet means,
a second oil mist and air containing chamber separate from said first chamber connected with said inlet means, said connection between said second chamber and said inlet means including oil mist forming means, said second chamber also connected with said outlet means and having a relatively low pressure,
oil conduit means from said first chamber to said second chamber for supplying oil to said second chamber from said first chamber in response to air pressure from said inlet means,
air passageway means from said inlet means to said outlet means, said air passageway means including variable orifice means for controlling the pressure drop between said inlet means and said outlet means and increase oil flow into said outlet means in a substantially linear relation in response to an increase in air flow through said lubricator.

15. The lubricator of claim 14 including oil flow control means in said oil conduit to control oil flow through said conduit to said second chamber.

16. The lubricator of claim 14 wherein said oil mist forming means comprise a tube terminating in the connection between said air inlet means and said second chamber said tube coacting with said connection to provide a venturi effect, the other end of said tube extending to a source of oil such that air flow through said connection draws oil through said tube to form a fine oil mist and air mixture in said second chamber said oil mist and air mixture being subsequently transported through said outlet means.

17. The lubricator of claim 16 wherein said oil source comprises an oil cup supplied by said oil conduit.

18. The lubricator of claim 14 including valve means between said inlet means and said first chamber, said valve means adapted to close whenever said air inlet pressure is substantially greater than said first chamber pressure.

19. The lubricator of claim 14 including valve means within said oil conduit adapted to close said oil conduit whenever flow of oil tends to flow from said second chamber to said first chamber and open when said oil flow tends from said first chamber to said second chamber.

20. The lubricator of claim 15 including fill plug means to said first chamber for opening said chamber to provide for filling of said first chamber with oil.

References Cited

UNITED STATES PATENTS

| | | | |
|---|---|---|---|
| 3,023,849 | 3/1962 | Tine | 184—55 |
| 3,085,654 | 4/1963 | Friedell et al. | 184—55 |
| 3,131,786 | 5/1964 | Gleason et al. | 184—55 |
| 3,149,698 | 9/1964 | Riske et al. | 184—55 |
| 3,243,014 | 3/1966 | Bjorklund | 184—55 |
| 3,244,257 | 4/1966 | German et al. | 184—55 |

MILTON KAUFMAN, Primary Examiner

M. A. ANTONAKAS, Assistant Examiner